United States Patent
Weber et al.

[15] 3,683,348
[45] Aug. 8, 1972

[54] PSYCHOSEDATICOMPOSITIONS CONTAINING 1-ACYL-5-PHENYL-1H-1,5-BENZODIAZEPINE-2,4-(3H, 5H)-DIONES AND METHODS OF USING THE SAME

[72] Inventors: Karl-Heinz Weber, Gau-Algesheim; Karl Zeile, Ingelheim (Rhine); Rolf Giesemann, Bingen (Rhine); Peter B. Danneberg, Ingelheim (Rhine), all of Germany

[73] Assignee: Boehringer Ingelheim GmbH, Ingelheim (Rhine), Germany

[22] Filed: March 25, 1971

[21] Appl. No.: 128,173

Related U.S. Application Data

[63] Continuation-in-part of Ser. No. 819,940, April 28, 1969, Pat. No. 3,624,076.

[30] Foreign Application Priority Data

April 29, 1968 Austria...................A 4165/68

[52] U.S. Cl....................424/244, 424/275, 424/285
[51] Int. Cl...............................................A61k 27/00
[58] Field of Search.......................................424/244

[56] References Cited

OTHER PUBLICATIONS

Buchi et al., " Hehr. Chim. Acta" Vol. 39, pp. 957–965 (1956).

Primary Examiner—Stanley J. Friedman
Attorney—Hammond & Littell

[57] ABSTRACT

Pharmaceutical compositions containing as an active ingredient a compound of the formula

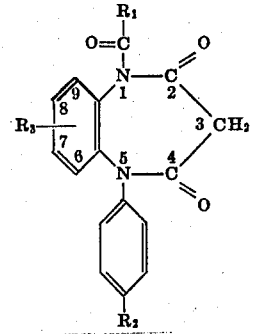

wherein
  $R_1$ is hydrogen, straight-chain alkyl of one to 15 carbon atoms, chloromethyl, trifluoromethyl, methylamino, ethoxy, cyclohexyl, phenyl, chlorophenyl, dichlorophenyl, tolyl, dimethoxyphenyl, nitrophenyl, benzyl, styryl, thienyl or furyl,
  $R_2$ is hydrogen, methyl, chlorine or methoxy, and
  $R_3$ is hydrogen, 7-chloro, 7-bromo, 8-methyl, 7-trifluoromethyl or 8-trifluoromethyl,
and methods of using said compositions as psychosedatives, muscle-relaxants and anticonvulsives.

10 Claims, No Drawings

PSYCHOSEDATIC COMPOSITIONS CONTAINING 1-ACYL-5-PHENYL-1H-1,5-BENZODIAZEPINE-2,4-(3H,5H)-DIONES AND METHODS OF USING THE SAME

This is a continuation-in-part of copending application Ser. No. 819,940, filed Apr. 28, 1969, now U.S. 3,624,076 issued Nov. 30, 1971.

This invention relates to novel pharmaceutical compositions comprising as an active ingredient a 1-acyl-5-phenyl-1H-1,5-benzodiazepine-2,4-[3H,5H]-dione, as well as to methods of using the said compositions as psychosedatives (tranquilizers), muscle-relaxants and anticonvulsives in warm-blooded animals.

More particularly, the present invention relates to novel pharmaceutical compositions containing as an active ingredient a compound of the formula

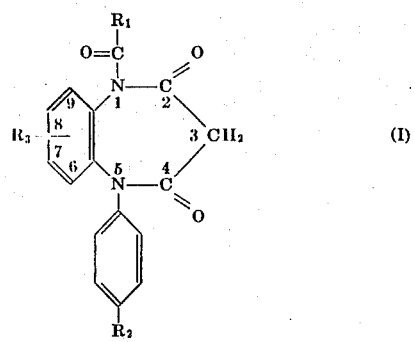

wherein
- $R_1$ is hydrogen, straight-chain alkyl of one to 15 carbon atoms, chloromethyl, trifluoromethyl, methylamino, ethoxy, cyclohexyl, phenyl, chlorophenyl, dichlorophenyl, tolyl, dimethoxyphenyl, nitrophenyl, benzyl, styryl, thienyl or furyl,
- $R_2$ is hydrogen, methyl, chlorine or methoxy, and
- $R_3$ is hydrogen, 7-chloro, 7-bromo, 8-methyl, 7-trifluoromethyl or 8-trifluoromethyl.

The compounds embraced by Formula I above may be prepared by acylation of a compound of the formula

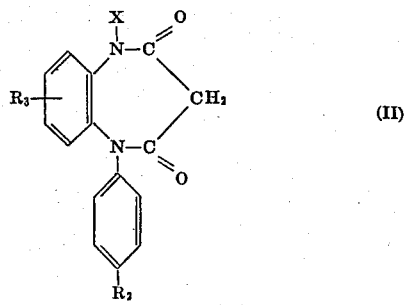

wherein $R_2$ and $R_3$ have the same meanings as in Formula I and X is hydrogen or an alkali metal, in the 1-position. The acylation may be effected with a common acylating agent, such as an acid halide, an acid anhydride or an isocyanate, pursuant to customary methods and under reaction conditions which are usually applied to acylation reactions.

The starting compounds of the Formula II, in turn, may be prepared as described in copending application Ser. No. 703,188, filed Feb. 5, 1968, that is, by cyclization of an N-phenyl-N-(2-aminophenyl)-malonic acid alkyl ester amide of the formula

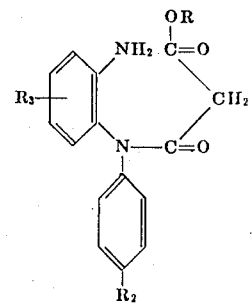

wherein R is lower alkyl and $R_2$ and $R_3$ have the same meanings as in Formula I. The hydrolysis and ring closure proceed smoothly and with good yields in an acid as well as an alkaline medium, preferably in the presence of an alcoholic or aqueous alcoholic solvent; however, other inert solvents such as tetrahydrofuran or dioxane, are also suitable; for acid cyclization, acetonitrile may also be used as the solvent. Mineral acids, and particularly hydrohalic acids, such as hydrochloric acid, hydrobromic acid, hydroiodic acid, sulfuric acid, phosphoric acid and perchloric acid are preferably used as acid cyclization agents. Examples of alkaline cyclization agents are sodium alcoholates and alkali metal hydroxides.

The reaction periods depend upon the quantity of acid or alkali employed and upon the type of solvent used; they vary between several hours and several days. The reaction temperatures are preferably between +20°C and the boiling point of the solvent which is used.

Examples of compounds of the Formula I which may be obtained by the above-described method are the following:
7-chloro-1-formyl-5-phenyl-1H-1,5-benzodiazepine-2,4-[3H,5H]-dione,
1-acetyl-7-chloro-5-phenyl-1H-1,5-benzodiazepine-2,4-[3H,5H]-dione,
7-chloro-5-phenyl-1-propionyl-1H-1,5-benzodiazepine-2,4-[3H,5H]-dione,
7-chloro-1-chloroacetyl-5-phenyl-1H,-1,5-benzodiazepine-2,4-[3H,5H]-dione,
7-chloro-5-phenyl-1-trifluoroacetyl-1H-1,5-benzodiazepine-2,4-[3H,5H]-dione,
7-chloro-1-cyclohexyl-carbonyl-5-phenyl-1H-1,5-benzodiaze-pine-2,4-[3H,5H]-dione,
1-benzoyl-7-chloro-5-phenyl-1H,-1,5-benzodiazepine-2,4-[3H,5H]-dione,
1-benzoyl-7-bromo-5-phenyl-1H,-1,5-benzodiazepine-2,4-[3H,5H]-dione,
1-benzoyl-8-methyl-5-phenyl-1H,-1,5-benzodiazepine-2,4-[3H,5H]-dione,
1-benzoyl-5-(p-methoxyphenyl)-1H-1,5-benzodiazepine-2,4-[3H,5H]-dione,
1-benzoyl-5-phenyl-8-trifluoromethyl-1H-1,5-benzodiazepine-2,4-[3H,5H]-dione,
1-benzoyl-7-chloro-5-(p-methylphenyl)-1H-1,5-benzodiazepine-2,4-[3H,5H]-dione,
1benzoyl-7-chloro-5-(p-chlorophenyl)-1H-1,5-benzodiazepine-2,4-[3H,5H]-dione,
1-benzoyl-5-phenyl-7-trifluoromethyl-1H-1,5-benzodiazepine-2,4-[3H,5H]-dione,
7-chloro-1-(o-methylbenzoyl)-5-phenyl-1H-1,5-benzodiazepine-2,4-[3H,5H]-dione,
7-chloro-1-(p-methylbenzoyl)-5-phenyl-1H-1,5- benzodiazepine-2,4-[3H,5H]-dione,
7-chloro-1-(o-fluorobenzoyl)-5-phenyl-1H-1,5-benzodiazepine-2,4-[3H,5H]-dione,
7-chloro-1-(p-nitrobenzoyl)-5-phenyl-1H,-1,5-benzodiazepine-2,4-[3H,5H]-dione,
7-chloro-1-(3,4-dimethoxybenzoyl)-5-phenyl-1H,-1,5-benzo-diazepine-2,4-[3H,5H]-dione,
7-chloro-1-(2,4-dichlorobenzoyl)-5-phenyl-1H-1,5-benzo-diazepine-2,4-[3H,5H]-dione,
7-chloro-5-phenyl-1-phenylacetyl-1H-1,5-benzodiazepine-2,4-[3H,5H]-dione,
7-chloro-1-cinnamyl-5-phenyl-1H-1,5-benzodiazepine-2,4-[3H,5H]-dione,
7-chloro-1-furoyl-5-phenyl-1H-1,5-benzodiazepine-2,4-[3H,5H]-dione,
7-chloro-5-phenyl-1-thenoyl-1H-1,5-benzodiazepine-2,4-[3H,5H]-dione,
1-ethoxycarbonyl-7-chloro-5-phenyl-1H-1,5-benzodiazepine-2,4-[3H,5H]-dione,
7-chloro-1-methylcarbamoyl-5-phenyl-1H-1,5-benzodiazepine-2,4-[3H,5H]-dione,
7-chloro-1-lauroyl-5-phenyl-1H-1,5-benzodiazepine-2,4-[3H,5H]-dione,
7-chloro-1-palmitoyl-5-phenyl-1H-1,5-benzodiazepine-2,4-[3H,5H]-dione and
1-benzoyl-5-phenyl-7-trifluoromethyl-1H-1,5-benzodiazepine-2,4-[3H,5H]-dione.

The following examples further illustrate the preparation of compounds of the Formula I and will enable others skilled in the art to understand it more completely.

EXAMPLE 1

1-benzoyl-7-chloro-5-phenyl-1H-1,5-benzodiazepine-2,4-[3H,5H]-dione 0.5 mol (154 gm) of the sodium salt of 7-chloro-5-phenyl-1H-1,5-benzodiazepine-2,4-[3H,5H]-dione were dissolved in 2 liters of tetrahydrofuran, and the solution was admixed at room temperature with 60 ml of benzoylchloride. The mixture was refluxed for three hours, then evaporated, and the residue was taken up in methylenechloride. Undissolved starting material was vacuum filtered off, and the filtrate was extracted with 300 to 500 ml of cold water. The methylenechloride phase was dried with anhydrous magnesium sulfate and evaporated, and the residue was recrystallized twice from toluene. One hundred and ten gm (55 percent of theory) of 1-benzoyl-7-chloro-5-phenyl-1H-1,5-benzodiazepine-2,4-[3H,5H]-dione, m.p. 208-209°C, of the formula

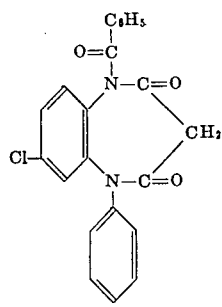

were obtained. The starting material was prepared as follows: 23 gm of sodium were dissolved in 2,3 liters of absolute alcohol, and 230 gm of N-(2-amino-5-chlorophenyl)-N-phenyl-malonic acid ethyl ester amide were added to the solution. After five hours' stirring at room temperature, the precipitated sodium salt was vacuum-filtered off, washed with cold alcohol and ether, and dried at 120°C. Yield: 200 gm (93 percent of theory).

EXAMPLE 2

1-benzoyl-7-chloro-5-phenyl-1H-1,5-benzodiazepine-2,4-[3H,5H]-dione 0.5 mol (143 gm) of 7-chloro-5-phenyl-1H-1,5-benzo-diazepine-2,4-[3H,5H]-dione were suspended in 2.5 liters of dry tetrahydrofuran and, after addition of 24 gm of a 50 percent sodium hydride suspension in mineral oil, the mixture was stirred at room temperature until everything had dissolved completely (about 1 hour). Thereafter, 122 gm of benzoic acid anhydride were added to the solution, and the mixture was refluxed for 10 minutes. The reaction mixture was worked up as described in Example 1, and the raw product was recrystallized from toluene. Fifty gm (25 percent of theory) of 1-benzoyl-7-chloro-5-phenyl-1H-1,5-benzodiazepine-2,4-[3H,5H]-dione, m.p. 208°–209°C, were obtained.

EXAMPLE 3

7-chloro-5-phenyl-1-propionyl-1H-1,5-benzodiazepine-2,4-[3H,5H]-dione 0.1 mol (28.6 gm) of 7-chloro-5-phenyl-1H-1,5-benzodiazepine-2,4-[3H,5H]-dione were suspended in 750 ml of absolute tetrahydrofuran, and the suspension was stirred with 5 gm of a 50 percent sodium hydride suspension in mineral oil for 2 hours at room temperature. After everything had dissolved, 13 gm of propionic acid anhydride were added, the mixture was first stirred for 2 hours at room temperature and then refluxed. After evaporation of the reaction solution in vacuo, the residue was taken up in methylene chloride, the insoluble matter was vacuum-filtered off, and the filtrate was washed with water, and evaporated, and the residue was recrystallized from toluene. Twenty nine gm (90 percent of theory) of 7-chloro-5-phenyl-1-propionyl-1H-1,5-benzodiazepine-2,4-[3H,5H]-dione, m.p. 194°–196°C, of the formula

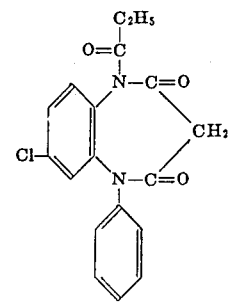

were obtained.

EXAMPLE 4

7-chloro-5-phenyl-1-propionyl-1H-1,5-benzodiazepine-2,4-[3H,5H]-dione 0.1 mol (28.6 gm) of 7-chloro-5-phenyl-1H-1,5-benzodiazepine-[3H,5H]-dione were refluxed with 200 ml of pyridine and 18 gm of propionic acid anhydride for 22 hours. Thereafter, the solution was evaporated in vacuo, and the raw product was worked up as described in Example 1. Yield: 25.8 gm (80 percent of theory), m.p. 194°–196°C.

EXAMPLE 5

7-chloro-5-phenyl-1-propionyl-1H-1,5- benzodiazepine-2,4-[3H,5H]-dione 0.1 mol (28.6 gm) of 7-chloro-5-phenyl-1H-1,5-benzodiazepine-2,4-[3H,5H]-dione were refluxed with 300 ml of propionic acid anhydride for 15 hours. Subsequently, the reaction solution was evaporated in vacuo, the residue was taken up in methylenechloride, and the reaction product was isolated as described in Example 1. Yield: 25.8 gm (80 percent of theory), m.p. 194°–196°C.

EXAMPLE 6

7-chloro-1-methylcarbamoyl-5-phenyl-1H-1,5-benzodiazepine-2,4-[3H,5H]-dione 0.1 mol (28.6 gm) of 7-chloro-5-phenyl-1H-1,5-benzodiazepine-2,4-[3H,5H]-dione were stirred with 850 ml of absolute dioxane, 30 ml of methylisocyanate and 1.5 ml of triethylamine for 15 hours at 40°C. Thereafter, the reaction solution was evaporated in vacuo, water was added to the residue, the crystals formed thereby were vacuum-filtered off, and the filter cake was recrystallized from methylenechloride/diisopropylether. Thirty gm (89 percent of theory) of 7-chloro-1-methylcarbamoyl-5-phenyl-1H-1,5-benzodiazepine-2,4-[3H,5H]-dione, m.p. 306°–308°C, of the formula

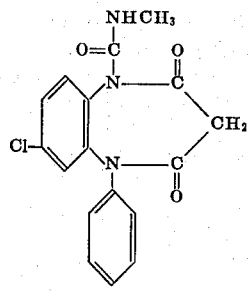

were obtained.

EXAMPLE 7

7-chloro-5-phenyl-1-propionyl-1H-1,5-benzodiazepine-2,4-[3H,5H]-dione 0.1 mol (28.6 gm) of 7-chloro-5-phenyl-1H-1,5-benzodiazepine-2,4-[3H,5H]-dione were refluxed with 20 gm of propionic acid anhydride in 480 ml of xylene for 72 hours. The reaction solution was allowed to cool and was then vacuum filtered; 20 gm of the starting material were recovered as the filter cake. By evaporating the filtrate 6 gm (19 percent of theory) of the reaction product, m.p. 194°–196°C, were isolated.

Using a procedure analogous to that described in the preceding examples, the following additional compounds of the Formula I above were prepared:

EXAMPLE 8

7-chloro-5-phenyl-1-ethoxycarbonyl-1H-1,5-benzodiazepine-2,4-[3H,5H]-dione, m.p. 187°–188°C, of the formula

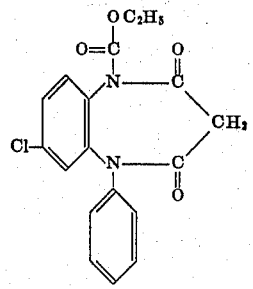

from 7-chloro-5-phenyl-1H-1,5-benzodiazepine-2,4-[3H,5H]-dione and ethoxycarbonyl chloride.

EXAMPLE 9

7-chloro-5-phenyl-1-formyl-1H-1,5-benzodiazepine-2,4-[3H,5H]-dione, m.p. 210-211°C, of the formula

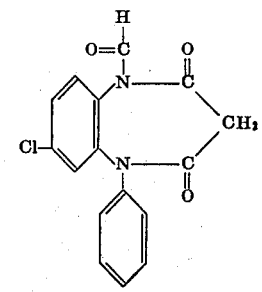

from 7-chloro-5-phenyl-1H-1,5-benzodiazepine-2,4-[3H,5H]-dione and formyl chloride.

EXAMPLE 10

7-chloro-5-phenyl-1-(o-chloro-benzyl)-1H-1,5-benzodiazepine-2,4-[3H,5H]-dione, m.p. 222°–224°C, of the formula

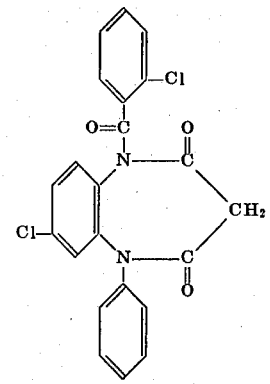

from 7-chloro-5-phenyl-1H-1,5-benzodiazepine-2,4-[3H,5H]-dione and o-chloro-benzoyl chloride.

EXAMPLE 11

7chloro-5-phenyl-1-(o-methyl-benzoyl)-1H-1,5-benzodiazepine-2,4-[3H,5H]-dione, m.p. 197°–200°C, of the formula

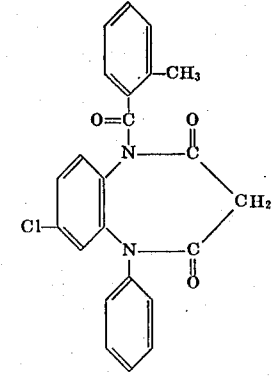

from 7-chloro-5-phenyl-1H-1,5-benzodiazepine-2,4-[3H,5H]-dione and o-methyl-benzoyl chloride.

EXAMPLE 12

7-chloro-5-phenyl-1-(p-methyl-benzoyl)-1H-1,5-benzodiazepine-2,4-[3H,5H]-dione, m.p. 194°–196°C, from 7-chloro-5-phenyl-1H-1,5-benzodiazepine-2,4-[3H,5H]-dione and p-methyl-benzoyl chloride.

EXAMPLE 13

7-chloro-5-phenyl-1-(o-fluoro-benzoyl)-1H-1,5-benzodiazepine-2,4-[3H,5H]-dione, m.p. 176°–178°C, of the formula

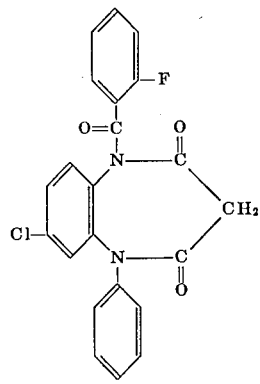

from 7-chloro-5-phenyl-1H-1,5-benzodiazepine-2,4-[3H,5H]-dione and o-fluoro-benzoyl chloride.

EXAMPLE 14

7-chloro-5-phenyl-1-(cyclohexyl-carbonyl)-1H-1,5-benzodiazepine-2,4-[3H,5H]-dione, m.p. 157°–159°C, of the formula

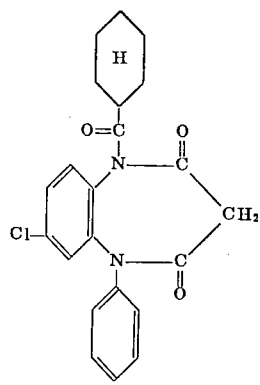

from 7-chloro-5-phenyl-1H-1,5-benzodiazepine-2,4-[3H,5H]-dione and cyclohexyl-carbonyl chloride.

EXAMPLE 15

7-chloro-5-phenyl-1-(o,p-dichloro-benzoyl)-1H-1,5-benzodiazepine-2,4-[3H,5H]-dione, m.p. 204°–205°C, of the formula

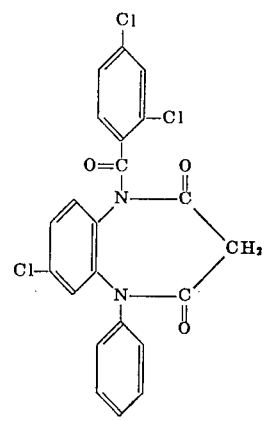

from 7-chloro-5-phenyl-1H-1,5-benzodiazepine-2,4-[3H,5H]-dione, m.p. 204°–205°C, of the formula

EXAMPLE 16

7-bromo-5-phenyl-1-benzoyl-1H-1,5-benzodiazepine-2,4-[3H,5H]-dione, m.p. 200–201°C, of the formula

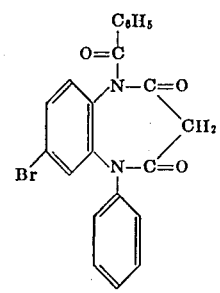

from 7-chloro-5-phenyl-1H-1,5-benzodiazepine-2,4-[3H,5H]-dione and benzoic acid anhydride.

EXAMPLE 17

7-chloro-5-phenyl-1-chloroacetyl-1H-1,5-benzodiazepine-2,4-[3H,5H]-dione, m.p. 208°–209°C, of the formula

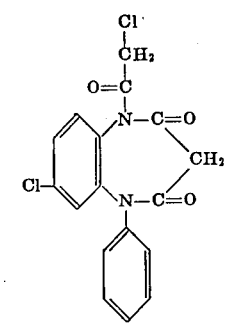

from 7-chloro-5-phenyl-1H-1,5-benzodiazepine-2,4-[3H,5H]-dione and chloroacetic acid anhydride.

EXAMPLE 18

7-chloro-5-phenyl-1-cinnamoyl-1H-1,5-benzodiazepine-2,4-[3H,5H]-dione, m.p. 205°–206°C, of the formula

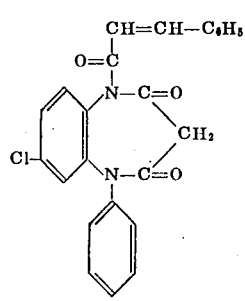

from 7-chloro-5-phenyl-1H-1,5-benzodiazepine-2,4-[3H,5H]-dione and cinnamoyl chloride.

EXAMPLE 19

8-methyl-5-phenyl-1-benzoyl-1H-1,5-benzodiazepine-2,4-[3H,5H]-dione, m.p. 214°–216°C, of the formula

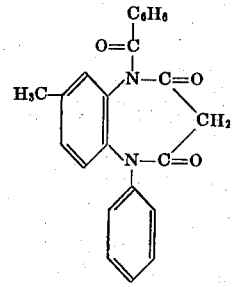

from 8-methyl-5-phenyl-1H-1,5-benzodiazepine-2,4-[3H,5H]-dione and benzoic acid anhydride.

EXAMPLE 20

5-(p-methoxy-phenyl)-1-benzoyl-1H-1,5-benzodiaze-pine-2,4-[3H,5H]-dione, m.p. 104°–106°C, of the formula

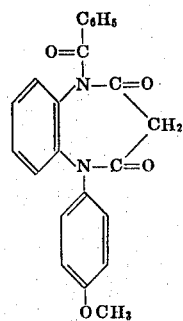

from 5-(p-methoxy-phenyl)-1H-1,5-benzodiazepine-2,4-[3H,5H]-dione and benzoic acid anhydride.

EXAMPLE 21

7-chloro-5-(p-chloro-phenyl)-1-benzoyl-1H-1,5-benzodiazepine-2,4-[3H,5H]-dione, m.p. 243°–245°C, of the formula

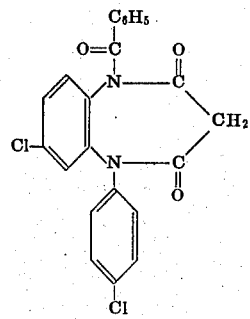

from 7-chloro-5-(p-chloro-phenyl)-1H-1,5-benzodiazepine-2,4-[3H,5H]-dione and benzoic acid anhydride.

EXAMPLE 22

7-chloro-5-p-tolyl-1-benzoyl-1H-1,5-benzodiazepine-2,4-[3H,5H]-dione, m.p. 165°–168°C, of the formula

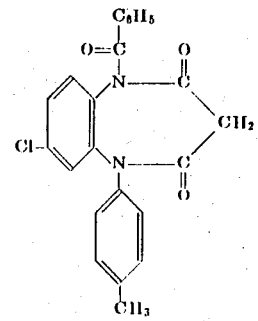

from 7-chloro-5-p-tolyl-1H-1,5-benzodiazepine-2,4-[3H,5H]-dione and benzoic acid anhydride.

EXAMPLE 23

7-trifluoromethyl-5-phenyl-1-benzoyl-1H-1,5-benzodiazepine-2,4-[3H,5H]-dione, m.p. 175°–178°C, of the formula

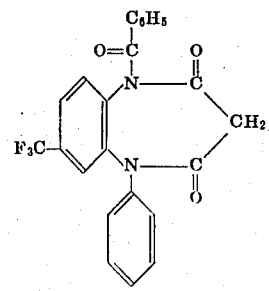

from 7-trifluoromethyl-5-phenyl-1H-1,5-benzodiazepine-2,4-[3H,5H]-dione and benzoic acid anhydride.

EXAMPLE 24

8-trifluoromethyl-5-phenyl-1-benzoyl-1H-1,5-benzodiazepine-2,4-[3H,5H]-dione, m.p. 213°–215°C, from 8-trifluoromethyl-5phenyl-1H-1,5-benzodiazepine-2,4-[3H,5H]-dione and benzoic acid anhydride.

EXAMPLE 25

7-chloro-5-phenyl-1-phenylacetyl-1H-1,5-benzodiaze-pine-2,4-[3H,5H]-dione, m.p. 127°–129°C, of the formula

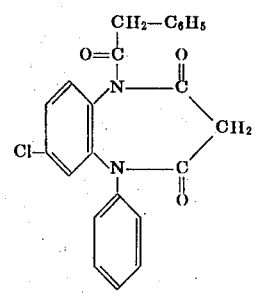

from 7-chloro-5-phenyl-1H-1,5-benzodiazepine-2,4-[3H,5HBV—DIONE AND PHENYLACETYL CHLORIDE)

EXAMPLE 26

7-chloro-5-phenyl-1-(m,p-dimethoxy-benzoyl)-1H-1,5-benzodiazepine-2,4-[3H,5H]-dione, m.p. 134°–137 °C, of the formula

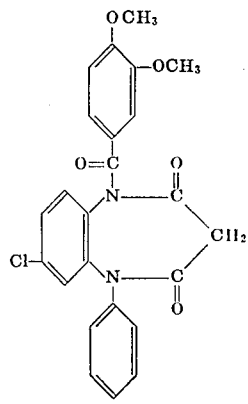

from 7-chloro-5-phenyl-1H-1,5-benzodiazepine-2,4-[3H,5H]-dione and m,p-dimethoxybenzoyl chloride.

EXAMPLE 27

7-chloro-5-phenyl-1(p-nitro-benzoyl)-1H-1,5-benzo-diazepine-2,4-[3H,5H]-dione, m.p. 216°–218°C, of the formula

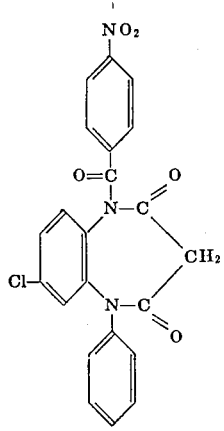

from 7-chloro-5-phenyl-1H-1,5-benzodiazepine-2,4-[3H,5H]-dione and p-nitro-benzoyl chloride.

EXAMPLE 28

7-chloro-5-phenyl-1-(2'-thenoyl)-1H-1,5-benzodiazepine-2,4-[3H,5H]-dione, m.p. 210°–212°C, of the formula

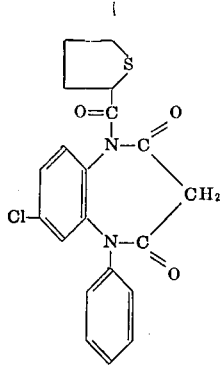

from 7-chloro-5-phenyl-1H-1,5-benzodiazepine-2,4-[3H,5H]-dione and 2-thenoyl chloride.

EXAMPLE 29

7-chloro-5-phenyl-1-(2'-furoyl)-1H-1,5-benzodizepine-2,4-[3H,5H]-dione, m.p. 228°–230°C, of the formula

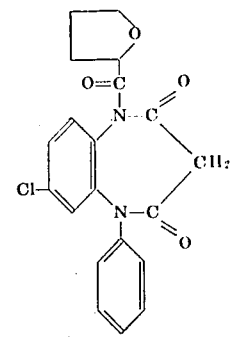

from 7-chloro-5-phenyl-1H-1,5-benzodiazepine-2,4-[3H,5H]-dione and 2-furoyl chloride.

EXAMPLE 30

7-chloro-5-phenyl-1-acetyl-1H-1,5-benzodiazepine-2,4-[3H,5H]-dione, m.p. 201°–203°C, of the formula

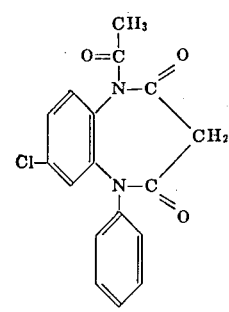

from 7-chloro-5-phenyl-1H-1,5-benzodiazepine-2,4-[3H,5H]-dione and acetic acid anhydride.

EXAMPLE 31

7-chloro-5-phenyl-1-trifluoroacetyl-1H-1,5-benzodiazepine-2,4-[3H,5H]-dione, m.p. 173°–175°C, of the formula

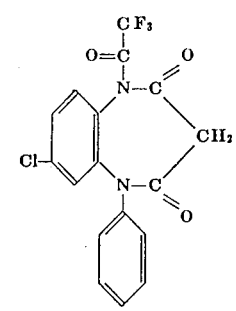

from 7-chloro-5-phenyl-1H-1,5-benzodiazepine-2,4-[3H,5H]-dione and trifluoroacetic acid chloride.

EXAMPLE 32

7-chloro-5-phenyl-1-lauroyl-1H-1,5-benzodiazepine-2,4-[3H,5H]-dione, m.p. 89°–91°C, of the formula

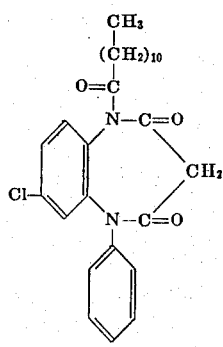

from 7-chloro-5-phenyl-1H-1,5-benzodiazepine-2,4-[3H,5H]-dione and lauroyl chloride.

EXAMPLE 33

7-chloro-5-phenyl-1-palmitoyl-1H-1,5-benzodiazepine-2,4-[3H,5H]-dione, m.p. 78°–80° C, of the formula

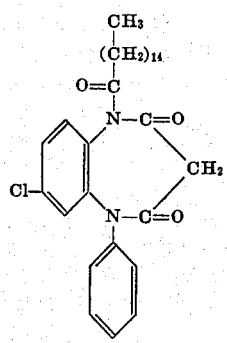

from 7-chloro-5-phenyl-1H-1,5-benzodiazepine-2,4-[3H,5H]-dione and palmitic acid chloride.

The compounds embraced by Formula I above have useful pharmacodynamic properties. More particularly, they exhibit psychosedative (tranquilizing), muscle-relaxing and anticonvulsive activities and very low toxicity in warm-blooded animals, such as mice, rats, cats, rabbits, and dogs.

The phychosedative (tranquilizing) activity and the median lethal dose of the compounds embraced by Formula I were ascertained by standard pharmacological tests on mice.

The tranquilizing activity was ascertained by means of the slide test, in which the treated test animals are placed on a smooth metal plate which is inclined at an angle of 35° from the horizontal. The median effective tranquilizing dose ($ED_{50}$) is that dose which causes 50 percent of the test animals to slide off the plate due to the psychosedative effect of the test compound.

The median lethal dose ($LD_{50}$) was determined by the method of Litchfield and Wilcoxon, J. Pharmacol. exptl. T herap., Vol. 96, pg. 99 (1949).

The following table shows the average values obtained from these tests for a representative number of compounds of the class defined by formula I, as well as the therapeutic index, i.e., the ratio $LD_{50}/ED_{50}$, calculated from these values.

TABLE

| Compound | Slidetest $ED_{50}$ mgm/kg | $LD_{50}$ mgm/kg | Therap. Index $LD_{50}/ED_{50}$ |
|---|---|---|---|
| 1-Benzoyl-5-phenyl-7-chloro-1H-1,5-benzodiazepine-2,4-[3H,5H]-dione | 4 | 16000 | 4000 |
| 7-Chloro-5-phenyl-1-propionyl-1H-1,5-benzodiazenpine-2,4-[3H,5H]-dione | 1 | 3000 | 3000 |
| 1-Benzoyl-7-bromo-5-phenyl-1H-1,5-benzodiazepine-2,4-[3H,5H]-dione | >5 | >4000 | 800 |
| 7-Chloro-1cinnamoyl-5-phenyl-1H-1,5-benzodiazepine-2,4-[3H,5H]-dione | >5 | >3800 | 760 |
| 7-Chloro-1-(2-methyl-benzoyl)-5-phenyl-1H-1,5-benzodiazepine-2,4-[3H,5H]-dione | >5 | >3650 | 730 |
| 7-Chloro-1-formyl-5-phenyl-1H-1,5-benzodiazepine-2,4-[3H,5H]-dione | >4 | >2835 | 709 |
| 7-Chloro-1-(3,4-dimethoxy-benzoyl)-5-phenyl-1H-1,5-benzodiazepine-2,4-[3H,5H]-dione | >6 | >4100 | 683 |
| 7-Chloro-1-cyclohexyl-carbonyl-5-phenyl-1H-1,5-benzodiazepine-2,4-[3H,5H]-dione | 6 | >3575 | >596 |
| 7-Chloro-5-phenyl-1-phenylacetyl-1H-1,5-benzodiazepine-2,4-[3H,5H]-dione | 8 | >3627 | 453 |
| 7-Chloro-1-chloroacetyl-5-phenyl-1H-1,5-benzodiazepine-2,4-[3H,5H]-dione | >4 | 1800 | 450 |
| 7-Chloro-1-(4-nitro-benzoyl)-5-phenyl-1H-1,5-benzodiazepine-2,4-[3H,5H]-dione | 9 | >4000 | >444 |
| 1-Acetyl-7-chloro-5-phenyl-1H-1,5-benzodiazepine-2,4-[3H,5H]-dione | >4 | 1700 | >425 |
| 7-Chloro-1-(4-methyl-benzoyl)-5-phenyl-1H-1,5-benzodiazepine-2,4-[3H,5H]-dione | 13 | >3650 | 281 |
| 7-Chloro-1-(2,4-dichloro-benzoyl)-5-phenyl-1H-1,5-benzodiazepine-2,4-[3H,5H]-dione | >17 | >4150 | 244 |
| 7-Chloro-1-(2-fluoro-benzoyl)-5-phenyl-1H-1,5-benzodiazepine-2,4-[3H,5H]-dione | 17 | >3680 | >216 |
| 7-Chloro-1-furanoyl-5-phenyl-1H-1,5-benzodiazepine-2,4-[3H,5H]-dione | 23 | >3500 | 151 |
| 7-Chloro-5-phenyl-1-thenoyl-1H-1,5-benzodiazepine-2,4-[3H,5H]-dione | = | >3600 | >112 |

For pharmaceutical purposes the compounds according to the present invention are administered to warm-blooded animals perorally or by the rectal route as active ingredients in customary dosage unit compositions, that is, compositions in dosage unit form consisting essentially of an inert solid pharmaceutical carrier and one effective dosage unit of the active ingredient, such as tablets, coated pills, capsules, wafers, powders, suppositories and the like. One effective dosage unit of the compounds according to the present invention is from 0.0166 to 0.84 mgm/kg body weight, preferably 0.083 to 0.42 mgm/kg body weight. The daily dose is from 0.166 to 2.5 mgm/kg.

The following examples illustrate a few dosage unit compositions comprising a compound of the Formula I as an active ingredient and represent the best mode contemplated of putting the invention to practical use. The parts are parts by weight unless otherwise specified.

EXAMPLE 34

Tablets
The tablet composition was compounded from the following ingredients:

| | | |
|---|---|---|
| 1-benzoyl-7-chloro-5-phenyl-1H-1,5-benzodiazepine-2,4-[3H,5H]-dione | | 10 parts |
| Lactose | | 33 parts |
| Corn starch | | 30 parts |
| Colloidal silicic acid | | 1 part |
| Magnesium stearate | | 1 part |
| | Total | 75 parts |

Compounding procedure:

a. The benzodiazepinedione compound was homogeneously stirred into a warmed fatty substance, such as polyethylene glycol or stearic acid, the resulting mixture was allowed to cool and solidify, and the solid mass was comminuted.

b. The lactose, the corn starch and the colloidal silicic acid were thoroughly admixed with each other, the mixture was granulated with the aid of a soluble starch paste, the comminuted benzodiazepinedione-fat mixture obtained in (a) and the magnesium stearate were admixed with the granulate, and the composition was compressed into 75 mgm tablets. Each tablet contained 10 mgm of the benzodiazepinedione compound and, when administered perorally to a warm-blooded animal of about 60 kg body weight in need of such treatment, produced very good psychosedative, muscle-relaxing and anticonvulsive effects.

The same results were obtained when 7-chloro-1-cinnamoyl-5-phenyl-1H-1,5-benzodiazepine-2,4-[3H,5H]-dione or 7-chloro-5-phenyl-1-propionyl-1H-1,5-benzodiazepine-2,4-[3H,5H]-dione was substituted for 1-benzoyl-7-chloro-5-phenyl-1H-1,5-benzodiazepine-2,4-[3H,5H]-dione in the above tablet composition.

EXAMPLE 35

Coated pills

The pill core composition was compounded from the following ingredients:

| | | |
|---|---|---|
| 1-Benzoyl-7-chloro-5-phenyl-1H-1,5-benzodiazepine-2,4-[3H,5H]-dione | | 5.0 parts |
| Lactose | | 28.5 parts |
| corn starch | | 15.0 parts |
| Gelatin | | 1.0 part |
| Magnesium stearate | | 0.5 part |
| | Total | 50.0 parts |

Compounding procedure:

A comminuted mixture of the benzodiazepinedione compound and a fatty substance, as described in Example 35(a), was prepared and the same was intimately admixed with the lactose and the corn starch. The resulting mixture was moistened with an aqueous 10 percent solution of the gelatin, the moist mass was forced through a 1 mm mesh screen and the resulting granulate was dried at 40° C and again passed through the screen. The dry granulate was uniformly admixed with the magnesium stearate, and the resulting composition was compressed into 50 mgm pill cores, which were then coated with a thin shell consisting essentially of a mixture of sugar, titanium dioxide, talcum and gum arabic, and the coated pills were polished with beeswax. Each pill contained 5 mgm of the benzodiazepinedione compound and, when administered perorally to a warm-blooded animal of about 60 kg body weight in need of such treatment, produced very good psychosedative, muscle-relaxing and anticonvulsive effects.

The same results were obtained when one of the following compounds was substituted for the benzodiazepinedione compound in the above pill core composition:

a. 7-chloro-5-phenyl-1-propionyl-1H-1,5-benzodiazepine-2,4-[3H,5H]-dione;
b. 7-chloro-1-cinnamoyl-5-phenyl-1H-1,5-benzodiazepine-2,4-[3H,5H]-dione;
c. 7-chloro-1-(3',4'-dimethoxy-benzoyl)-5-phenyl-1H-1,5-benzodiazepine-2,4-[3H,5H]-dione; or
d. 1-benzoyl-7-bromo-5-phenyl-1H-1,5-benzodiazepine-2,4-[3H,5H]-dione.

EXAMPLE 36

Gelatin capsules

The capsule filler composition was compounded from the following ingredients:

| | | |
|---|---|---|
| 1-Benzoyl-7-chloro-5-phenyl-1H-1,5-benzodiazepine-2,4-[3H,5H]-dione | | 10.0 parts |
| Corn starch | | 190.0 parts |
| | Total | 200.0 parts |

Compounding procedure:

A comminuted mixture of the benzodiazepinedione compound and a fatty substance, as described in Example 35(a), was prepared and the same was intimately admixed with the corn starch, and 200 mgm portions of the resulting mixture were filled into gelatin capsules of suitable size. Each capsule contained 10 mgm of the benzodiazepinedione compound and, when administered perorally to a warm-blooded animal of about 60 kg body weight in need of such treatment, produced very good psychosedative, muscle-relaxant and anticonvulsive effects.

The same results were obtained when 7-chloro-5-phenyl-1-propionyl-1H-1,5-benzodiazepine-2,4-[3H,5H]-dione or 7-chloro-1-formyl-5-phenyl-1H-1,5-benzodiazepine-2,4-[3H,5H]-dione was substituted for the benzodiazepinedione compound in the above capsule filler composition.

EXAMPLE 37

Sustained release pills

The pill core composition was compounded from the following ingredients:

| | | |
|---|---|---|
| 1-Benzoyl-7-chloro-5-phenyl-1H-1,5-benzodiazepine-2,4-[3H,5H]-dione | | 20.0 parts |
| Carboxymethyl cellulose | | 300.0 parts |
| Stearic acid | | 20.0 parts |
| Cellulose acetate phthalate | | 40.0 parts |
| | Total | 380.0 parts |

Compounding procedure:

The benzodiazepinedione compound, the carboxymethyl cellulose and the stearic acid were intimately admixed with each other, the resulting mixture was moistened with a solution of the cellulose acetate phthalate in 200 ml of a mixture of ethanol and ethyl acetate, the moist mass was forced through a 1.5 mm-mesh screen, the resulting granulate was dried at 40°C, and the dry granulate was compressed into 380 mgm pill cores which were subsequently coated with a thin shell consisting essentially of a mixture of sugar and polyvinylpyrrolidone. Each pill contained 20 mgm of the benzodiazepinedione compound and, when administered perorally to a warm-blooded animal of about 60 kg body weight in need of such treatment, produced very good psychosedative, muscle-relaxing and anticonvulsive effects.

The same results were obtained when 7-chloro-5phenyl-1-propionyl-1H-1,5-benzodiazepine-2,4-[3H,5]-dione or 7-chloro-1-cinnamoyl-5-phenyl-1H-

1,5-benzodiazepine-2,4-[3H,5H]-dione was substituted for the benzodiazepinedione compound in the above sustained release pill core composition.

EXAMPLE 38

Suppositories

The suppository composition was compounded from the following ingredients:

| | |
|---|---|
| -(1-Benzoyl-7-chloro-5-phenyl-1H-1,5 benzodiazepine-2,4-[3H,5H]-dione | 5.0 parts |
| Suppository base (cocoa butter or mixture of triglycerides) | 1695.0 parts |
| Total | 1700.0 parts |

Compounding procedure:

The benzodiazepinedione compound was finely pulverized and then uniformly blended with an immersion homogenizer into the suppository base which had previously been melted and cooled to 40°C. 1,700 mgm portions of the resulting composition were poured at 35°C into cooled suppository molds. Each suppository contained 5 mgm of the benzodiazepinedione compound and, when administered by the rectal route to a warm-blooded animal of about 60 kg body weight in need of such treatment, produced very good psychosedative, muscle-relaxing and anticonvulsive effects.

The same results were obtained when 7-chloro-1-cinnamoyl-5-phenyl-1H-1,5-benzodiazepine-2,4-[3H,5H]-dione or 7-chloro-5-phenyl-1-propionyl-1H-1,5-benzodiazepine-2,4-[3H,5H]-dione was substituted for the benzodiazepinedione compound in the above suppository composition.

Analogous results were obtained when an equal amount of 7-chloro-1-cyclohexylcarbonyl-5-phenyl-1H-1,5-benzodiazepine-2,4-[3H,5H]-dione,
7-chloro-1-chloroacetyl-5-phenyl-1H-1,5-benzodiazepine-2,4-[3H,5H]-dione,
7-chloro-1-lauroyl-5-phenyl-1H-1,5-benzodiazepine-[3H,5BV]-dione,
7-chloro-1-phenylacetyl-5-phenyl-1H-1,5-benzodiazepine-2,4-[3H,5H]-dione,
or any one of the other compounds embraced by Formula I above was substituted for the particular benzodiazepinedione compounds in Example 34 through 38. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A pharmaceutical dosage unit composition consisting essentially of a solid inert pharmaceutical carrier and an effective psychosedative, muscle-relaxing and anti-convulsive amount of a compound of the formula

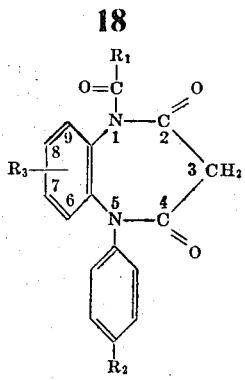

wherein
$R_1$ is hydrogen, straight-chain alkyl of one to 15 carbon atoms, chloromethyl, trifluoromethyl, methylamino, ethoxy, cyclohexyl, phenyl, chlorophenyl, dichlorophenyl, tolyl, dimethoxyphenyl, nitrophenyl, benzyl, styryl, thienyl or furyl,
$R_2$ is hydrogen, methyl, chlorine or methoxy, and
$R_3$ is hydrogen, 7-chloro- 7-bromo-, 8-methyl, 7-trifluoromethyl or 8-trifluoromethyl.

2. A composition according to claim 1, wherein said compound is 1-benzoyl-7-chloro-5-phenyl-1H-1,5-benzodiazepine-2,4-[3H,5H]-dione.

3. A composition according to claim 1, wherein said compound is 7-chloro-1-cinnamoyl-5-phenyl-1H-1,5-benzodiazepine-2,4-[3H,5H]-dione.

4. A composition according to claim 1, wherein said compound is 7-chloro-5-phenyl-1-propionyl-1H-1,5-benzodiazepine-2,4-[3H,5H]-dione.

5. A composition according to claim 1, wherein said compound is 7-chloro-1-(3',4'-dimethoxy-benzoyl)-5-phenyl-1H-1,5-benzodiazepine-2,4-[3H,5H]-dione.

6. The method of inducing psychosedation, relaxing the muscles and suppressing convulsions in a warm-blooded animal in need of such treatment, which comprises perorally or rectally administering to said animal an effective psychosedative, muscle-relaxing and anticonvulsive amount of a compound of the formula

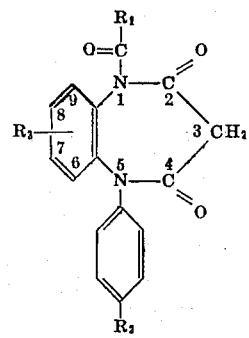

wherein
$R_1$ is hydrogen, straight-chain alkyl of one to 15 carbon atoms, chloromethyl, trifluoromethyl, methylamino, ethoxy, cyclohexyl, phenyl, chlorophenyl, dichlorophenyl, tolyl, dimethoxyphenyl, nitrophenyl, benzyl, styryl, thienyl or furyl,
$R_2$ is hydrogen, methyl, chlorine or methoxy, and $R_3$ is hydrogen, 7-chloro-, 7-bromo-, 8-methyl, 7-trifluoromethyl or 8-trifluoromethyl.

7. The method according to claim 6, wherein said compound is 1-benzoyl-7-chloro-5-phenyl-1H-1,5-benzodiazepine-2,4-[3H,5H]-dione.

8. The method according to claim 6, wherein said compound is 7-chloro-1-cinnamoyl-5-phenyl-1H-1,5-benzodiazepine-2,4-[3H,5H]-dione.

9. The method according to claim 6, wherein said compound is 7-chloro-5-phenyl-1-propionyl-1H-1,5-benzodiazapine-2,4-[3H,5H]-dione.

10. The method according to claim 6, wherein said compound is 7-chloro-1-(3′,4′-dimethoxy-benzoyl)-5-phenyl-1H-1,5-benzodiazepine-2,4-[3H,5H]-dione.

* * * * *